S. B. ORR.
WEIGHING MACHINE FOR GRAIN.
APPLICATION FILED FEB. 19, 1915. RENEWED JAN. 4, 1917.
1,217,050.
Patented Feb. 20, 1917.
2 SHEETS—SHEET 1.
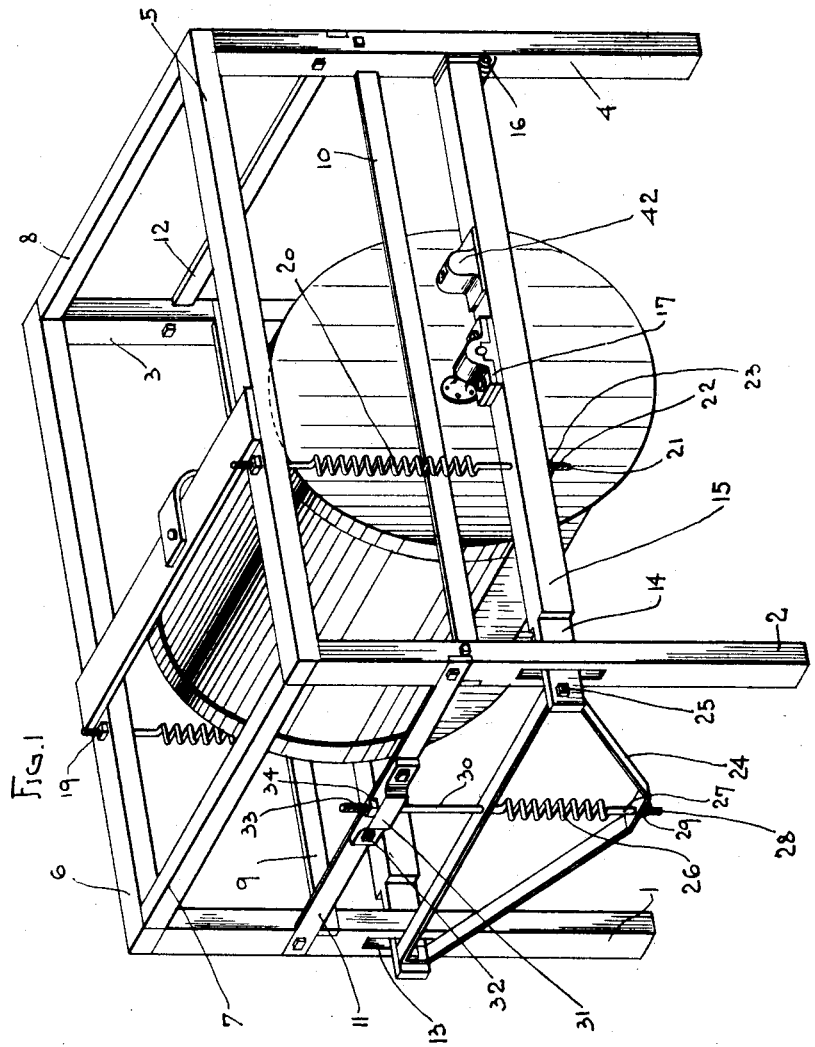
WITNESSES:
Frank Frimmer
Charles F. Eichards
INVENTOR.
S. B. ORR
BY Max H. Srolon
ATTORNEY.

S. B. ORR.
WEIGHING MACHINE FOR GRAIN.
APPLICATION FILED FEB. 19, 1915. RENEWED JAN. 4, 1917.
1,217,050.
Patented Feb. 20, 1917.
2 SHEETS—SHEET 2.
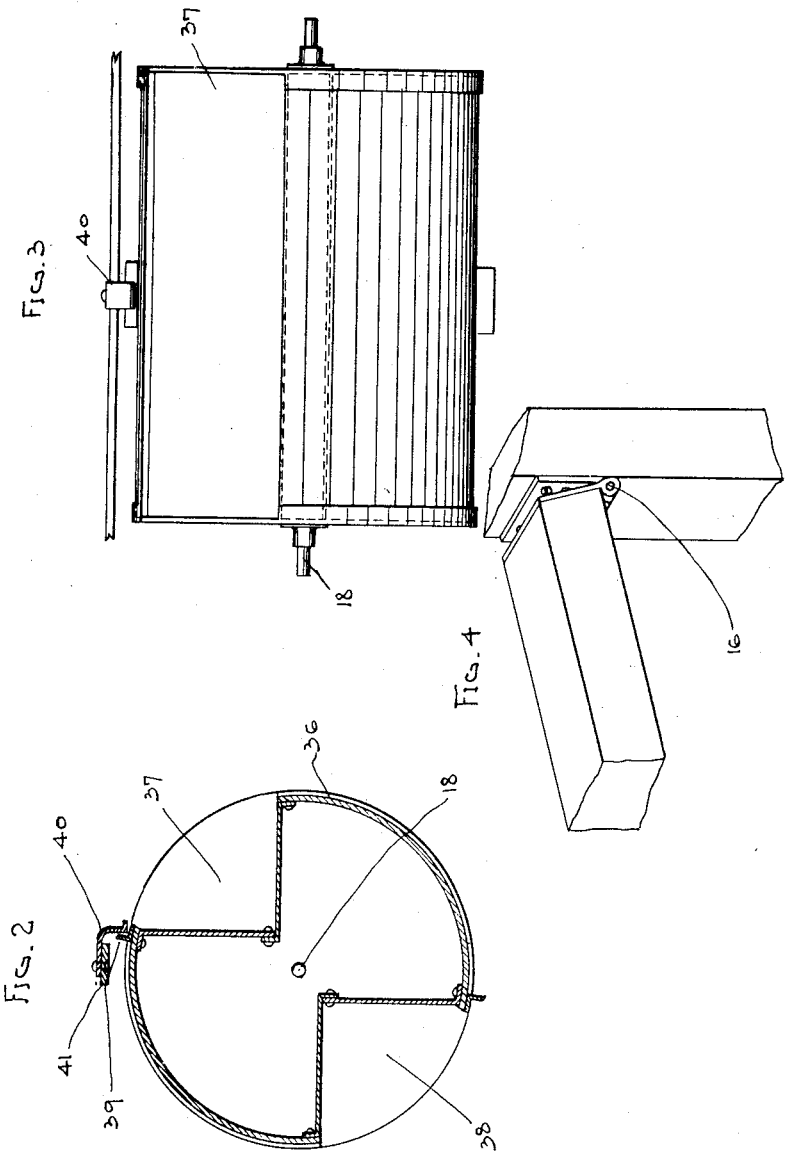
WITNESSES:
Frank Trimmer
Charles F. Eichardt
INVENTOR.
S. B. ORR
BY Max H. Srolovitz
ATTORNEY.

UNITED STATES PATENT OFFICE

SAMUEL B. ORR, OF CIRCLEVILLE, OHIO.

WEIGHING-MACHINE FOR GRAIN.

1,217,050.           Specification of Letters Patent.      Patented Feb. 20, 1917.

Application filed February 19, 1915, Serial No. 9,400. Renewed January 4, 1917. Serial No. 140,651.

*To all whom it may concern:*

Be it known that I, SAMUEL B. ORR, a citizen of the United States, residing at Circleville, in the county of Pickaway and State of Ohio, have invented certain new and useful Improvements in Weighing-Machines for Grain, of which the following is a specification.

This invention relates to weighing machines for grain or other substances but more particularly adapted for use in weighing husk corn, as the ears of the corn are conveyed from the husking machine, and has for its object to provide means, in a manner as hereinafter set forth, for automatically weighing grain particularly husk corn, in bulk, then automatically discharging the weighed material, at the same time actuating a register operating means, so as to indicate the number of weighings or the aggregate total of the material weighed, but more particularly to indicate the aggregate number of weighs.

Further objects of the invention are to provide an automatic weighing machine which is simple in its construction and arrangement, strong, durable, efficient and convenient in its use, readily set up and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of an automatic weighing machine in accordance with this invention.

Fig. 2 is a cross sectional view of the weighing drum.

Fig. 3 is an elevation of the weighing drum.

Fig. 4 is a detail illustrating one end of one of the hinged supporting levers for the shaft of the weighing drum.

Referring to the drawings in detail the machine comprises a rectangular supporting frame including two pairs of vertically disposed uprights. The uprights of one pair are indicated at 1 and 2 and the uprights of the other pair at 3 and 4. The upright 2 is connected to the upright 4 by a longitudinally extending top bar 5 and the upright 1 is connected to the upright 3 by a longitudinally extending top bar 6. Between the top bars 5 and 6 at one end is arranged a transverse top bar 7 and between the top bars 5 and 6 at the other end is arranged a transverse top bar 8. The top bars 5 and 8 are secured together in any suitable manner and the top bars 5 and 6 are secured to the uprights 1, 4, in any suitable manner.

The upright 1 is connected to the upright 3 by a longitudinal brace 9 which is secured to said uprights below the top bar 6 and the uprights 2, 4 are connected together by a longitudinal extending brace 10 which is arranged below the top bar 5.

The uprights 1 and 2 are connected together by a transverse brace 11 and the uprights 3 and 4 are connected together by a transverse brace 12.

The uprights 1 and 2 are each provided with a vertically disposed elongated rectangular slot 13 and through the said slots 13, extend the reduced ends 14, of a pair of longitudinally disposed supporting levers 15. The reduced ends 14 of the levers 15 project forwardly from the uprights 1 and 2. The other ends of the supporting levers 15 have a hinged connection therebetween and to uprights 3, 4, as indicated at 16 and by such an arrangement the reduced ends 14 of the levers 15 can be swung downwardly when occasion so requires.

Mounted upon each of the supporting levers 15, centrally thereof, is a bearing 17, only one of which is shown, and journaled in the bearings 17 is a drum shaft 18.

Adjustably connected to the top bars 5 and 6, are the upper ends 19 of a pair of vertically disposed springs 20 and these latter have their lower ends 21 adjustably connected to the supporting levers 15. The function of the springs 20 is to normally maintain the supporting levers in the position as shown in Fig. 1 whereby the hinged connection will be closed. The ends 19 and 21 of the springs 20 are threaded as at 22 and engaging the said threaded ends are adjustable nuts 23 which are employed for increasing or decreasing the tension of the springs 20.

Secured between the reduced ends 14 of the supporting levers 15, forward of the uprights 1, 2, is a triangular shaped member 24. The hold fast devices for securing the member 24 in position are indicated at 25.

Arranged within the member 24, is a spring 26, having its lower end 27 extended to project through the bottom of the member 24, and said lower end 27 is threaded as at 28, and engaging with said threaded end 28 is an adjustable nut 29. The upper end of the spring 26 is extended as at 30 and which projects through a bracket 31 secured to the brace 11, by the hold fast devices 32. The extended upper end 30 of the spring 26 is threaded as at 33 and engaging with said threaded end is an adjustable nut 34, the latter being arranged above the bracket 31. The end 29 is arranged below the member 24. The function of the spring 26 is to co-act with the springs 20 to maintain the hinged connection between the supporting levers 15 and the uprights 3, 4, closed and for further purposes to be presently referred to.

Secured to the shaft 18 is a drum 36, having a pair of pockets 37, 38. The mouth of each of the pockets 37, 38 is permanently open. Carried by the periphery of the drum 36 is a stop member 39 for each pocket, adapted to engage a resilient retaining member 40, which is carried by a transverse bar 41 secured to the top bars 5, 6.

The springs 20, 26 are employed to normally maintain the reduced ends of the supporting levers 15 elevated so that the retaining member 40 will be in the path of the stop member 39, under such conditions, arresting movement of the drum whereby the drum will be set in the position as illustrated in Fig. 2.

It will be assumed that the drum 36 is in the position as shown in Fig. 2, and that the material is fed to the pocket 37, when the weight of the material in the pocket 37 overcomes the strength of the springs 20, 26, the supporting lever 15 will be swung downwardly and the hinged connection 16, under such conditions the stop member 39 can pass the resilient retaining member 40 and the material weighed in the pocket 37, will be dumped owing to the fact that the weight of the material will cause the drum 36 to revolve.

By way of example, it will be assumed that the machine is to weigh a quantity of material of a weight of fifty pounds each, thereby it is obvious that when either of the pockets 37 or 38 receive material of a weight equal to fifty pounds, the strength of the springs 30, 26, will be overcome, the supporting lever 15 swung downwardly on their hinged connections and the drum will be caused to revolve owing to the weight of the material.

One of the supporting levers may be provided with a conventional registering mechanism, as indicated at 42, whereby each half revolution will be registered to indicate a weigh.

What I claim is:—

1. A weighing machine comprising a normally locked weighing drum having a plurality of pockets for the reception of the material to be weighed, a revoluble shaft fixed to said drum, spring controlled levers having one end hinged and further having bearings for said shaft and capable of being shifted when the weight of the material supplied to a pocket exceeds a predetermined amount thereby releasing the drum to permit the same to revolve by gravity to dump the material from said pocket, and means for limiting the revolving movement of the drum at each operation to position an empty pocket to be filled.

2. A weighing machine comprising a normally locked weighing drum having a plurality of pockets for the reception of the material to be weighed, a revoluble shaft fixed to said drum, spring controlled levers having one end hinged and further having bearings for said shaft and capable of being shifted when the weight of the material supplied to a pocket exceeds a pre-determined amount thereby releasing the drum to permit the same to revolve by gravity to dump the material from said pocket, and means for limiting the revolving movement of the drum at each operation to position an empty pocket to be filled, a spring controlled means for said levers at the other end thereof, and means for adjusting said spring controlled means.

3. A weighing machine comprising a supporting frame, a pair of supporting levers each having one end hinged to said frame and its other end projecting from the frame, a resilient element for controlling the projecting ends of said levers, resilient elements connected to said frame and to said levers and associating with the other resilient element for normally maintaining said levers closed at their hinged connections, a revoluble drum supported by said levers and provided with pockets for the reception of the material to be weighed, said levers capable of being shifted when the weight of the material supplied to a pocket exceeds a pre-determined amount thereby overcoming said resilient elements and permitting of the drum to be revolved to enable the material in said pocket to be dumped, and means for limiting the revolving movement of the drum causing thereby a pocket to be held in position to be supplied with the material to be weighed.

4. A weighing machine comprising a revoluble spring controlled weighing mechanism including a drum carried by hinged supports and provided with pockets for the reception of the material to be weighed and capable of being shifted by gravity when the material supplied to a pocket exceeds a pre-determined amount, means for arresting the revolving movement of the drum causing thereby the positioning of a pocket for the reception of material to be weighed, a supporting frame to which said supports are hinged, and said means for arresting the revolving movement of the drum being carried by the drum and said frame.

5. A weighing machine comprising a revoluble spring controlled weighing mechanism including a drum carried by hinged supports and provided with pockets for the reception of the material to be weighed, the spring controlled elements of said mechanism being adjustable and connected with said supports, said drum automatically revolved by gravity when the material supplied to a pocket exceeds a pre-determined weight, and means for arresting the revolving movement of the drum to position an empty pocket to be filled.

6. A machine for the purpose described comprising a gravity revoluble and vertically shiftable drum provided with the pockets for the reception of the material to be weighed and shifting downwardly and then revolved to dump when the material supplied to a pocket exceeds a pre-determined weight, hinged supports for said drum, adjustable means connected with the supports for shifting the drum upwardly after it has dumped, and means for arresting the drum while revolving to hold an empty pocket in position to receive material to be weighed.

7. A machine for the purpose described comprising a gravity revoluble and vertically shiftable drum provided with the pockets for the reception of the material to be weighed and shifting downwardly and then revolved to dump when the material supplied to a pocket exceeds a pre-determined weight, hinged supports for said drum, adjustable elements connected to one end and intermediate the ends of said supports for shifting the drum upwardly after it has dumped, a resilient retaining member arranged above the drum, and a stop carried by the drum and engaging said member for temporarily arresting the drum while revolving to hold an empty pocket in position to receive material to be weighed.

8. A weighing machine comprising a normally locked gravity revoluble and vertically shiftable drum provided with pockets for the reception of the material to be weighed and shifting vertically from locked position and revolved when the material supplied to a pocket exceeds a pre-determined weight, shiftable supports for said drum, adjustable elements connected with one end and intermediate the ends of said supports for restoring the drum in position to be locked, and means for temporarily locking the drum from movement.

In testimony whereof I affix my signature in presence of two witnesses.

SAMUEL B. ORR.

Witnesses:
 C. R. BARNHART,
 M. E. McLEAN.